US008831240B2

(12) United States Patent
Zhong

(10) Patent No.: US 8,831,240 B2
(45) Date of Patent: Sep. 9, 2014

(54) BLUETOOTH DEVICE AND AUDIO PLAYING METHOD USING THE SAME

(75) Inventor: Xuebo Zhong, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 667 days.

(21) Appl. No.: 13/010,085

(22) Filed: Jan. 20, 2011

(65) Prior Publication Data

US 2012/0003937 A1     Jan. 5, 2012

(30) Foreign Application Priority Data

Jun. 30, 2010    (CN) .......................... 2010 1 0213862

(51) Int. Cl.
    *H04R 1/10*       (2006.01)
    *H04M 1/60*       (2006.01)
    *H04M 1/05*       (2006.01)
    *H04M 1/725*      (2006.01)
(52) U.S. Cl.
    CPC .............. *H04M 1/6066* (2013.01); *H04M 1/05* (2013.01); *H04M 2250/12* (2013.01); *H04M 2250/02* (2013.01); *H04M 1/72594* (2013.01)
    USPC .......................................... 381/74; 381/384
(58) Field of Classification Search
    USPC .................................................. 381/74, 384
    See application file for complete search history.

(56) References Cited

U.S. PATENT DOCUMENTS

| 7,590,233 B2 | 9/2009 | Chiloyan |
| 2007/0147629 A1* | 6/2007 | Chiloyan ........................ 381/74 |
| 2010/0310087 A1* | 12/2010 | Ishida ............................. 381/74 |

FOREIGN PATENT DOCUMENTS

WO     2006090197      8/2006

OTHER PUBLICATIONS

Translation of Chinese Office Action, Application No. 2010102138624, dated Aug. 23, 2013.
Bo et al.; "A new 3D tracking system based on accelerometer"; J. Huazhong Univ. of Sci. & Tech. (Natural Science Edition); vol. 37, No. 6, Jun. 2009.

* cited by examiner

*Primary Examiner* — Davetta W Goins
*Assistant Examiner* — Amir Etesam
(74) *Attorney, Agent, or Firm* — Renner, Otto, Boisselle & Sklar, LLP.

(57) ABSTRACT

The present invention relates to a Bluetooth device and an audio playing method using the same. In which the Bluetooth device may be a Bluetooth headset, including: a locus detection unit, an identification unit and a Bluetooth module, wherein the locus detection unit is configured to detect a motion locus of the Bluetooth headset during a process where the Bluetooth headset is placed onto the user's ear; the identification unit configured to identify whether the Bluetooth headset is placed on the user's left ear or right ear by comparing the motion locus of the Bluetooth headset with predetermined left ear or right ear characteristic loci, and transmit an identification result to the Bluetooth module; the Bluetooth module is configured to receive left channel audio signal when the identification result of the identification unit is left ear, and receive right channel audio signal when the identification result is right ear.

17 Claims, 9 Drawing Sheets

BLUETOOTH DEVICE AND AUDIO PLAYING METHOD USING THE SAME

FIELD OF THE INVENTION

The present application relates to the field of electronic technique, and more particularly, to Bluetooth device and system and audio playing method using the Bluetooth device.

DESCRIPTION OF THE RELATED ART

With the development of miniaturized electronic products, portable electronic devices such as MP3 player, MP4 player, cell phone, personal digital assistant (PDA) and portable computer become more and more necessary in people's lives. Whichever of the above electronic products is used, the headset is a very useful accessory, in order that the user can listen to the sound signal provided by the electronic product without disturbing other persons. In addition, listening to the sound signals played or received by these electronic products with the headset can also reduce interference from ambient noises (e.g., sounds generated when an automobile or train is started or people talk around).

The headset includes wire headset and wireless headset. With the development and maturity of Bluetooth technique, the wireless Bluetooth headset becomes more and more popular. The wireless Bluetooth headset is easy to be used and can prevent the user from being restrained by the "electric wire". Furthermore, it causes low radiation and little power consumption, and has no limitation to the transmission angle. Presently, the Bluetooth headset includes mono Bluetooth headset and stereo Bluetooth headset, wherein the stereo Bluetooth headset can bring better sound effect to the user. In the existing stereo Bluetooth headsets, one conventional design is that one Bluetooth module is connected to two earphones through connection lines, and the Bluetooth module receives stereo audio signal from an audio signal playing terminal and outputs left channel audio signal and right channel audio signal to predetermined left earphone and right earphone, respectively. But the connection lines between the two earphones of the stereo headset cause inconvenience to the user, and the user needs to watch the "left" and "right" mark on the earphones to identify the left earphone and the right earphone, which costs the user's time undoubtedly. Furthermore, it is obviously inapplicable for persons of poor eyesight or even blind men to identify the left earphone and right earphone of the headset. Thus, how to provide a headset in which there is no connection between the two earphones and the left and right earphones can be identified automatically is a problem not solved yet by the prior art.

SUMMARY OF THE INVENTION

The present invention is proposed with respect to the above problem of the prior art. The present invention relates to provide a Bluetooth headset capable of automatically identifying left ear and right ear to correctly supply corresponding left channel and right channel audio signals to the left ear and right ear.

According to a first aspect of the present invention, a Bluetooth headset is provided, including a locus detection unit configured to detect a motion locus of the Bluetooth headset during a process where the Bluetooth headset is placed onto the user's ear; and a Bluetooth module configured to transmit the motion locus to a Bluetooth module at an audio playing terminal, receive left channel or right channel reception instruction from the audio playing terminal, and receive corresponding left channel or right channel audio signal from the audio playing terminal according to the left channel or right channel reception instruction.

According to another aspect, the locus detection unit may include: an acceleration sensor configured to detect accelerations of the Bluetooth headset in three dimensional directions; and a locus calculation unit configured to calculate the motion locus of the Bluetooth headset according to the detected accelerations.

According to another aspect, the locus detection unit may include: an acceleration sensor configured to detect accelerations of the Bluetooth headset in three dimensional directions; an angular velocity sensor configured to detect angular velocity of the Bluetooth headset around at least one of the three dimensional directions; and a locus calculation unit configured to calculate the motion locus of the Bluetooth headset according to the accelerations detected by the acceleration sensor and the angular velocity detected by the angular velocity sensor.

According to another aspect of the present invention, an audio playing terminal is provided, including: a Bluetooth module configured to receive from a first Bluetooth headset a motion locus of the first Bluetooth headset; and an identification unit configured to identify whether the first Bluetooth headset is placed on the user's left ear or right ear by comparing the motion locus of the first Bluetooth headset with predetermined left ear or right ear characteristic loci, and transmit left channel or right channel reception instruction corresponding to the identification result to the first Bluetooth headset through the Bluetooth module.

According to another aspect, the audio playing terminal further includes a storage unit configured to store the left ear or right ear characteristic loci.

According to another aspect, the identification unit is further configured to transmit the right channel reception instruction to a second Bluetooth headset through the Bluetooth module when the identification result is left ear, and transmit the left channel reception instruction to the second Bluetooth headset through the Bluetooth module when the identification result is right ear.

According to another aspect, the identification unit includes: an interception unit configured to intercept a part of motion locus from the tail of the motion locus of the first Bluetooth headset; and a determination unit configured to identify whether the first Bluetooth headset is placed on the user's left ear or right ear by comparing the intercepted motion locus with the predetermined left ear or right ear characteristic loci, and transmit an identification result to the Bluetooth module.

According to another aspect of the present invention, an audio playing system is provided, including: an audio playing terminal and a first Bluetooth headset. The first Bluetooth headset includes: a first locus detection unit configured to detect a motion locus of the first Bluetooth headset during a process where the first Bluetooth headset is placed onto the user's ear; and a first Bluetooth module configured to transmit the motion locus to the audio playing terminal, receive left channel or right channel reception instruction from the audio playing terminal, and receive corresponding left channel or right channel audio signal from the audio playing terminal according to the left channel or right channel reception instruction. The audio playing terminal includes: a terminal Bluetooth module configured to receive from the first Bluetooth headset the motion locus of the first Bluetooth headset; and an identification unit configured to identify whether the first Bluetooth headset is placed on the user's left ear or right ear by comparing the motion locus of the first Bluetooth headset with predetermined left ear or right ear characteristic loci, and transmit left channel or right channel reception instruction corresponding to the identification result to the first Bluetooth headset via the Bluetooth module.

According to another aspect, the audio playing terminal further includes a storage unit configured to store the left ear or right ear characteristic loci.

According to another aspect, the system further includes a second Bluetooth headset. The identification unit is further configured to transmit the right channel reception instruction to the second Bluetooth headset through the terminal Bluetooth module when the identification result is left ear, and transmit the left channel reception instruction to the second Bluetooth headset through the terminal Bluetooth module when the identification result is right ear.

According to another aspect, the system further includes a second Bluetooth headset including a second locus detection unit and a second Bluetooth module. The second locus detection unit is configured to detect a motion locus of the second Bluetooth headset during a process where the second Bluetooth headset is placed onto the user's ear; the second Bluetooth module is configured to transmit the motion locus of the second Bluetooth headset to the audio playing terminal, receive left channel or right channel reception instruction from the audio playing terminal, and receive corresponding left channel or right channel audio signal from the audio playing terminal according to received left channel or right channel reception instruction. The terminal Bluetooth module is further configured to receive from the second Bluetooth headset the motion locus of the second Bluetooth headset; the identification unit is further configured to identify whether the second Bluetooth headset is placed on the user's left ear or right ear by comparing the motion locus of the second Bluetooth headset with the predetermined left ear or right ear characteristic loci, and transmit the left channel or right channel reception instruction corresponding to the identification result to the second Bluetooth headset through the Bluetooth module.

According to another aspect of the present invention, a Bluetooth headset is provided, including: a locus detection unit, an identification unit and a Bluetooth module, wherein: the locus detection unit is configured to detect a motion locus of the Bluetooth headset during a process where the Bluetooth headset is placed onto the user's ear; the identification unit is configured to identify whether the Bluetooth headset is placed on the user's left ear or right ear by comparing the motion locus of the Bluetooth headset with predetermined left ear or right ear characteristic loci, and transmit an identification result to the Bluetooth module; the Bluetooth module is configured to receive left channel audio signal when the identification result of the identification unit is left ear, and receive right channel audio signal when the identification result is right ear.

According to another aspect, the locus detection unit includes: an acceleration sensor configured to detect accelerations of the Bluetooth headset in three dimensional directions; and a locus calculation unit configured to calculate the motion locus of the Bluetooth headset according to the detected accelerations.

According to another aspect, the locus detection unit including: an acceleration sensor configured to detect accelerations of the Bluetooth headset in three dimensional directions; an angular velocity sensor configured to detect angular velocity of the Bluetooth headset around at least one of the three dimensional directions; and a locus calculation unit configured to calculate the motion locus of the Bluetooth headset according to the accelerations detected by the acceleration sensor and the angular velocity detected by the angular velocity sensor.

According to another aspect, the identification unit includes: an interception unit configured to intercept a part of motion locus from the tail of the motion locus of the first Bluetooth headset; and a determination unit configured to identify whether the first Bluetooth headset is placed on the user's left ear or right ear by comparing the intercepted motion locus with the predetermined left ear or right ear characteristic loci, and transmit an identification result to the Bluetooth module.

According to another aspect, the Bluetooth headset further includes: a storage unit configured to store the left ear or right ear characteristic loci.

According to another aspect, the Bluetooth headset further includes: a switch configured to control the startup of at least one of the locus detection unit, the identification unit and the Bluetooth module.

According to another aspect of the present invention, an audio playing method using Bluetooth headset is provided, including: a step of locus detection: detecting a motion locus of the Bluetooth headset during a process where the Bluetooth headset is placed onto the user's ear; a step of identification: identifying whether the Bluetooth headset is placed on the left ear or right ear by comparing the motion locus of the Bluetooth headset with predetermined left ear or right ear characteristic loci; and a step of output: receiving and outputting, by the Bluetooth headset, left channel or right channel audio signal corresponding to an identification result in the step of identification.

According to another aspect, the step of locus detection is performed in the Bluetooth headset, and the step of identification is performed in an audio playing terminal, wherein the method further includes: transmitting, by the Bluetooth headset, the motion locus of the Bluetooth headset to the audio playing terminal; and notifying, by the audio playing terminal, information indicating the identification result in the step of identification to the Bluetooth headset.

According to another aspect, detecting the motion locus of the Bluetooth headset during the process where the Bluetooth headset is placed onto the user's ear includes: detecting accelerations of the Bluetooth headset in three dimensional directions during the process where the Bluetooth headset is placed onto the user's ear; and calculating the motion locus of the Bluetooth headset according to the detected accelerations.

According to another aspect, detecting the motion locus of the Bluetooth headset during the process where the Bluetooth headset is placed onto the user's ear includes: detecting accelerations of the Bluetooth headset in three dimensional directions and angular velocity of the Bluetooth headset around at least one of the three dimensional directions during the process where the Bluetooth headset is placed onto the user's ear; and calculating the motion locus of the Bluetooth headset according to the detected accelerations and angular velocity.

According to another aspect, identifying whether the Bluetooth headset is placed on the left ear or right ear by comparing the motion locus of the Bluetooth headset with the predetermined left ear or right ear characteristic loci includes: intercepting a part of motion locus from the tail of the motion locus of the Bluetooth headset; and identifying whether the Bluetooth headset is placed on the user's left ear or right ear by comparing the intercepted motion locus with the predetermined left ear or right ear characteristic loci.

These and other aspects and features will be clearer with reference to the following descriptions and drawings. The embodiments of the present invention are disclosed in detail in the following descriptions and drawings for the convenience of understanding the ways for implementing the principles and/or features of the present invention. But it shall be appreciated that the scope of the present invention is not limited by these embodiments, and the present invention covers all changes, improvements and equivalents within the scope of the claims.

Features described and/or illustrated with respect to one embodiment can be used in one or more other embodiments in a same or similar way, and/or combine with or replace features in other embodiments.

To be noted, the term "include/comprise/have" herein refers to existence of feature, component, step and assembly, not excluding existence or addition of one or more other features, components, steps, assemblies or a combination thereof.

Many aspects of the present invention can be understood better with reference to the following drawings. The constituent parts of the drawings are not necessarily drafted in proportion, but just for illustrating the principles and/or features of the present invention more clearly. For the convenience of illustrating and describing some parts of the present invention, and promoting the understanding of the embodiments, some parts of the drawings may be enlarged, e.g., enlarging those parts with respect to other parts in an exemplary apparatus practically manufactured according to the present invention. Elements and features described in a drawing or embodiment of the present invention can be combined with elements and features illustrated in one or more other drawings or embodiments. In addition, same or corresponding reference signs are used to represent same or corresponding constituent parts in all the drawings, and they also can be used to represent same or corresponding constituent parts in more than one embodiment.

BRIEF DESCRIPTION OF THE DRAWINGS

The included drawings constitute a part of the Specification, for illustrating the embodiments of the present invention and interpreting the principles and/or features of the present invention together with the text description. The drawings in the following description are just some embodiments of the present invention, and a person skilled in the art can obtain other drawings based on these drawings without paying any creative effort, in which.

DETAILED DESCRIPTION OF THE PREFERRED EMBODIMENTS

To be noted, in order to avoid the present invention from being vague due to unnecessary details, the drawings only illustrate device structures and/or processing steps closely associated with the solution of the present invention, and other details not so relative to the present invention are omitted.

Since the headset has a different locus when it is placed by a hand of the user to the user's left ear as compared with the condition when it is placed by a hand of the user to the user's right ear, the embodiments of the present invention identify whether the headset is placed on the left ear or right ear according to the motion locus of the headset during the process of placing the headset (the first headset or the second headset) to the ear by the user, i.e., identify the left ear or right ear according to the motion locus, so as to automatically control the headset to receive corresponding left channel signal or right channel signal according to the result of identification. Thus, when the user randomly wears two headsets, one on the left ear and one on the right ear, the two headsets will be automatically controlled to receive corresponding left channel signal and right channel signal to realize stereo, without distinguishing the left and right headsets in advance.

The embodiments of the present invention intend to provide a Bluetooth headset device having two separate headsets, i.e., the Bluetooth headset device includes a first headset and a second headset without any mechanical or wired connection therebetween. Thus it is more convenient to use for the user, and only one of the headsets can also be used.

In the embodiments of the present invention, the first and second headsets may be configured to be capable of locus detection and left/right ear identification, so as to receive the signal from corresponding channel. In addition, the first and/or second headset may be configured to be only capable of locus detection, while the identification of left/right ear where the headset is located is designed to be implemented in the audio playing terminal.

In the embodiments of the present invention, the term "audio playing terminal" includes all apparatuses capable of outputting stereo signal via Bluetooth module, such as MP3 player, MP4 player, mobile phone, electronic notebook, personal digital assistant (PDA), smart phone and portable communication apparatus, etc.

The embodiments of the present invention are described in detail as follows.

Embodiment 1

Figure 1:
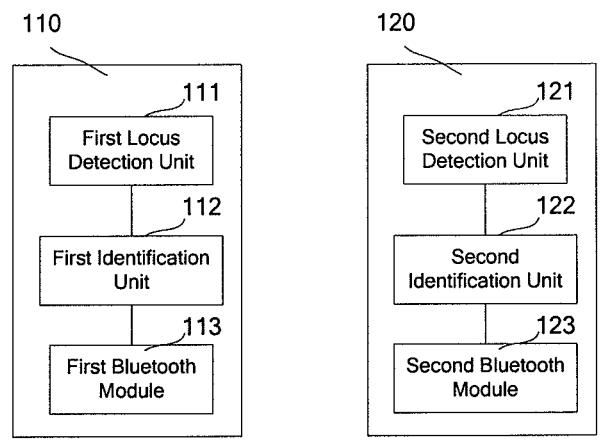
FIG. 1 is a schematic block diagram of a stereo Bluetooth headset according to an embodiment of the present invention.

FIG. 1 is a schematic block diagram of a stereo Bluetooth headset according to Embodiment 1 of the present invention. As illustrated in FIG. 1, the stereo Bluetooth headset in the present embodiment includes a first headset 110 and a second headset 120. There is no connection, e.g., no mechanical or wired connections, between the first headset 110 and the second headset 120. The first headset 110 is provided with a first locus detection unit 111, a first identification unit 112 and a first Bluetooth module 113. The second headset 120 is provided with a second locus detection unit 121, a second identification unit 122 and a second Bluetooth module 123.

The first locus detection unit 111 is configured to calculate the motion locus of the first headset. For example, the first locus detection unit 111 calculates the motion locus of the first headset according to the acceleration of the first headset during the process of placing the first headset 110 to the user's ear. After the acceleration of the first headset is detected, the displacement of the first headset can be acquired through a double integration of the acceleration, thereby the motion locus can be obtained.

The first identification unit 112 is configured to identify whether the first headset 110 is placed on the user's left ear or right ear by comparing the motion locus of the first headset with the predetermined left ear or right ear characteristic loci, and to transmit the result of identification to the first Bluetooth module 113.

The first Bluetooth module 113 is configured to receive a left channel audio signal transmitted by a Bluetooth module of the audio signal playing terminal (e.g., MP3 player, MP4 player, cell phone, PDA or portable computer that outputs stereo signal through a Bluetooth module) and output the left channel audio signal when the result of identification by the first identification unit 112 is left ear, and to receive a right channel audio signal transmitted by the Bluetooth module of the audio signal playing terminal and output the right channel audio signal when the result of identification is right ear.

Similarly, the second locus detection unit 121 is configured to calculate the motion locus of the second headset. For example, the second locus detection unit 121 calculates the motion locus of the second headset according to the acceleration of the second headset during the process of placing the second headset 120 to the user's ear.

The second identification unit 122 is configured to identify whether the second headset 120 is placed on the user's left ear or right ear by comparing the motion locus of the second headset with predetermined left ear or right ear characteristic loci, and to transmit the result of identification to the second Bluetooth module 123.

The second Bluetooth module 123 is configured to receive a left channel audio signal transmitted by a Bluetooth module of the audio signal playing terminal and output the left channel audio signal when the result of identification by the second identification unit 122 is left ear, and to receive a right channel audio signal transmitted by the Bluetooth module of the audio signal playing terminal and output the right channel audio signal when the result of identification is right ear.

In an exemplary embodiment of the present invention, the first Bluetooth module 113 and the second Bluetooth module 123 can carry out not only a wireless signal reception but also a wireless signal transmission.

In the embodiment of the present invention, the first headset 110 and the second headset 120 may have same or different shapes (e.g., they may be designed independently from each other or designed to have symmetrical shapes), so long as they are capable of automatically identifying left/right ear and receiving and outputting the audio signal of corresponding channel, respectively.

Figure 3:
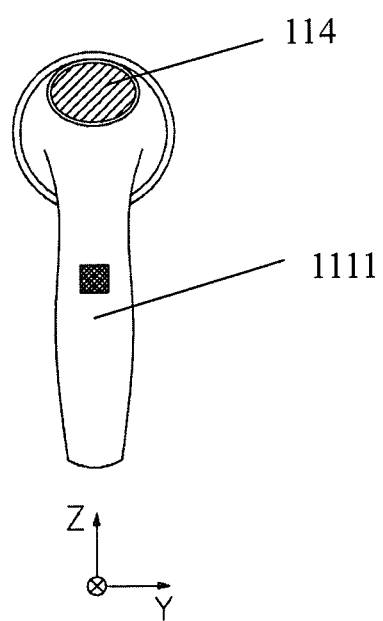
FIG. 3 is a front view of a first headset according to an embodiment of the present invention.

Furthermore, in the present embodiment, the first headset and the second headset may be provided with a first switch and a second switch, respectively. FIG. 3 illustrates a first switch 114 configured to control the startup of at least one of the first locus detection unit 111, the first identification unit 112 and the first Bluetooth module 113. For example, the first switch 114 may wholly control the startup of the first locus detection unit 111, the first identification unit 112 and the first Bluetooth module 113, or respectively control the startup of the first locus detection unit 111, the first identification unit 112 and the first Bluetooth module 113 through the times of sequentially pressing the first switch 114. For example, only the first Bluetooth module 113 is started up when the first switch 114 is pressed for a first time, the first locus detection unit 111 and the first identification unit 112 are then started up when the first switch 114 is pressed again, and all the units and module are shut down when the switch is pressed for a third time. Or only the first Bluetooth module 113 is started up when the first switch 114 is pressed for a first time, and the first Bluetooth module 113, the first locus detection unit 111 and the first identification unit 112 are started up simultaneously when the first switch 114 is pressed twice sequentially, etc. Thus the Bluetooth module may be only started up, and the first locus detection unit 111 and the first identification unit 112 are shut down, when a mono speech signal is to be received, so that the Bluetooth headset directly may receive the speech signal through the Bluetooth module, without identifying the left/right ear. Herein the aforementioned operations of the first switch are just examples, and the present invention is not limited thereto.

Similarly, a second switch (not shown, but which is provided in the second headset, as is mentioned above, for example) is configured to control the startup of at least one of the second locus detection unit 121, the second identification unit 122 and the second Bluetooth module 123. The second switch may be configured to be same as the first switch. The first switch and the second switch may be arranged at any appropriate positions on the housings of the first headset and the second headset, not limited by the positions as illustrated in FIG. 3.

The present embodiment is described as follows in conjunction with examples.

EXAMPLE 1

Figure 2:
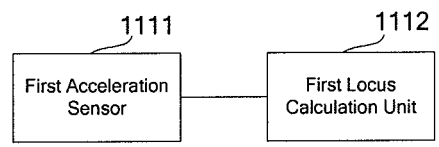
FIG. 2 is a block diagram of Example 1 of a first locus detection unit in FIG. 1.

In Example 1, as illustrated in FIG. 2, the first locus detection unit 111 includes: a first acceleration sensor 1111 and a first locus calculation unit 1112. The first acceleration sensor 1111 is preferably a tri-axial acceleration sensor configured to detect accelerations (linear accelerations) of the first headset in three dimensional directions (e.g., directions of three coordinate axes of the tri-axial acceleration sensor) during the process of placing the first headset to the user's ear. The first locus calculation unit 1112 is configured to calculate the motion locus of the first headset according to the accelerations of the first headset in three dimensional directions. The first acceleration sensor 1111 may be arranged at any appropriate position inside or outside the first headset, not limited to the position as illustrated in FIG. 3 (the first locus detection unit in FIG. 3 is arranged inside the first headset).

Similarly, the second locus detection unit 121 may include: a second acceleration sensor (not shown) and a second locus calculation unit (not shown). The second acceleration sensor is preferably a tri-axial acceleration sensor configured to detect accelerations (linear accelerations) of the second headset in three dimensional directions (e.g., directions of three coordinate axes of the tri-axial acceleration sensor) during the process of placing the second headset to the user's ear. The second locus calculation unit is configured to calculate the motion locus of the second headset according to the accelerations of the second headset in three dimensional directions. The second acceleration sensor may be arranged at any appropriate position inside or outside the second headset.

The tri-axial acceleration sensor is a kind of Micro Electro-Mechanical Systems (MEMS) element widely used at present, and it may be manufactured in a very small size so as to be applied in mobile terminals such as the cell phone. The tri-axial acceleration sensor can be used not only for the control of gaming action, but also for the gesture identification of handheld device and the operation of user interface (UI). Moreover, in practical applications, three-dimensional components of the acceleration (e.g., components of the acceleration in axes X, Y, Z which are perpendicular to each other) of a certain characteristic point of the measured object during movement can be collected accurately so long as the tri-axial acceleration sensor is placed at the characteristic point. Then information such as the motion locus of the characteristic point can be acquired through a double integration of the components of the acceleration. Tracking of three-dimensional space motion locus based on the tri-axial acceleration sensor is introduced in the literature "A new 3D-tracking system based on accelerometer", Journal of Huazhong University of Science and Technology (Nature Science), Issue 06, Volume 37, 2009.

The tri-axial acceleration sensor mainly includes types of piezoelectric, capacitive, heat flow, piezoresistive, tunneling, resonant, surface acoustic wave, etc. The most basic principle of these sensors is to cause deformation of a certain medium through the acceleration, measure a deformation amount of the medium, converts it into a voltage through the related circuit and then outputs, thus the acceleration sensor is an electro-mechanical element composed of the medium and the auxiliary circuit. The tri-axial acceleration sensor used in the present invention may be, but not limited to, any type of the above sensors or other sensors.

Detection of the accelerations of an object in three dimensional directions by using a tri-axial acceleration sensor arranged on the object, and calculation of the relative motion locus of the object through a double integration according to the accelerations in three dimensional directions belong to the prior art, thus the detailed description thereof is not given herein.

Hereinafter the identification of left/right ear by the headset is described by taking the first headset 110 as an example.

Figure 4:
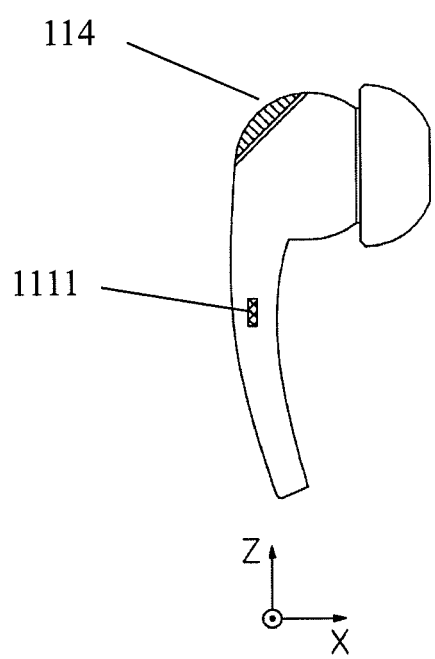
FIG. 4 is a right view of the first headset in FIG. 3.

For the convenience of description and understanding, in the embodiments of the present invention, directions of the three axes of the tri-axial acceleration sensor are predefined, for example, the sound outgoing direction of the first headset is direction X, the direction from the bottom to the top of the headset is direction Z, and direction Y is determined through the right-hand rule according to directions X and Z. Thus, in the right view of the first headset as illustrated in FIG. 4, the positive direction of axis X is horizontally rightward, the positive direction of axis Z is vertically upward, and the direction of axis Y is determined through the right-hand rule according to the directions of axes X and Z (i.e., perpendicular to the principal plane of the paper on which the drawing is shown, e.g., being outward). In addition, the three-dimensional xyz space where the user locates is defined as follows: a straight direction from the user's left ear to right ear is the positive direction of axis x, a direction of the user's height (a vertically upward direction) is the positive direction of axis z, and the direction of axis y is determined through the right-hand rule, i.e., a direction from the front to the rear and perpendicular to the plane xz is the positive direction of axis y. Thus, under the state that the first headset 110 is placed on the left ear, the three axes X, Y, Z of the tri-axial acceleration sensor have the same directions as the three axes of space xyz, that is to say, the direction of axis X is consistent with that of axis x, the direction of axis Y is consistent with that of axis y, and the direction of axis Z is consistent with that of axis z.

For example, during the process of placing the first headset as illustrated in FIG. 4 on the left ear with user's left hand, the operation performed generally includes:

1) the user holds the first headset (the sound outgoing direction is rightward) with the left hand, and raises the forearm so as to move the first headset to the outside of the left ear;

2) the user places the first headset on the left ear (e.g., places the first headset in the left auricle), and then stops moving the first headset.

During the process, the three axes X, Y, Z of the tri-axial acceleration sensor have the same directions as the three axes of space xyz, that is to say, the direction of axis X is consistent with that of axis x, the direction of axis Y is consistent with that of axis y, and the direction of axis Z is consistent with that of axis z. At that time, the locus of the first headset is reflected as follows in space xyz: firstly moving along the positive direction of axis y (positive direction of axis Y) and the positive direction of axis z (positive direction of axis Z), then moving along the positive direction of axis x (positive direction of axis X), and finally stopping. When the headset moves along the positive directions of axes y and z, a movement along the positive direction or the negative direction of axis x may also exist simultaneously.

Figure 5:
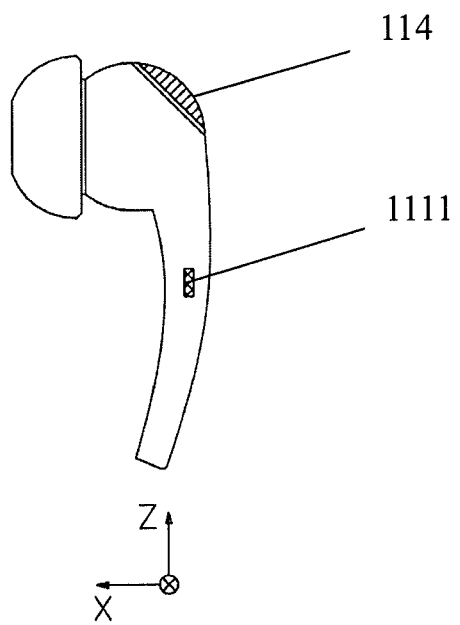
FIG. 5 is a left view of the first headset in FIG. 3.

For another example, during the process of placing the first headset as illustrated in FIG. 5 on the right ear with user's right hand, the operation performed generally includes:

1) the user holds the first headset (the sound outgoing direction is leftward) in the right hand, and raises the forearm so as to move the first headset to the outside of the right ear;

2) the user places the first headset on the right ear (e.g., places the first headset in the right auricle), and then stops moving the first headset.

During the process, the three axes X, Y, Z of the tri-axial acceleration sensor have directions different from those of the three axes of space xyz, for example, the direction of axis X is opposed to that of axis x, the direction of axis Y is opposed to that of axis y, and only the direction of axis Z is consistent with that of axis z. At that time, the locus of the first headset is reflected as follows in space xyz: firstly moving along the positive direction of axis y (negative direction of axis Y) and the positive direction of axis z (positive direction of axis Z), then moving along the negative direction of axis x (positive direction of axis X), and finally stopping. When the headset moves along the positive directions of axes y and z, a movement along the positive direction or negative direction of axis x may also exist simultaneously.

It can be seen that the first headset has different motion loci when being placed on the left ear and right ear. In the embodiments of the present invention, the locus detection unit 111 can calculate a relative motion locus of the first headset in relation to its initial position during the process of placing the headset to the ear with hand according to the accelerations collected by the tri-axial acceleration sensor in directions X, Y, Z.

In the embodiments of the present invention, one or more left ear characteristic loci and one or more right ear characteristic loci may be pre-established according to the possible loci when the user places the headset on the left ear and right ear, and then be stored in a storage unit of the Bluetooth headset. The left ear characteristic loci and the right ear characteristic loci may be indicated with the coordinates in the directions of the three axes of the tri-axial acceleration sensor in relation to the initial detection position, or be indicated with the coordinates in the three dimensional coordinate system of the previously defined space xyz. When the coordinates of space xyz are used to indicate the left ear and right ear characteristic loci, the left ear and right ear characteristic loci indicated by the three dimensional coordinates of the tri-axial acceleration sensor may be mapped to the coordinate system of space xyz according to predetermined mapping relationship to form the left ear and right ear characteristic loci in space xyz. The predetermined mapping relationship may be determined according to the relationship between the tri-axial coordinates of the tri-axial acceleration sensor and the coordinates of space xyz. More particularly, the mapping relationship may be the correspondence relationship between the tri-axial directions of the tri-axial acceleration sensor and the tri-axial directions of space xyz when the headset is placed on the left ear (hereinafter referred to as left ear mapping relationship). For example, the left ear mapping relationship may be as follows: the tri-axial directions of the tri-axial acceleration sensor are consistent with the tri-axial directions of space xyz, i.e., the direction of axis X is consistent with that of axis x, the direction of axis Y is consistent with that of axis y, and the direction of axis Z is consistent with that of axis z. In addition, the mapping relationship may also be the correspondence relationship between the tri-axial directions of the tri-axial acceleration sensor and the tri-axial directions of space xyz when the headset is placed on the right ear (hereinafter referred to as right ear mapping relationship). For example, the right ear mapping relationship may be as follows: the direction of axis X is opposed to that of axis x, the direction of axis Y is opposed to that of axis y, and the direction of axis Z is consistent with that of axis z. Herein the mapping relationships are just examples, and the present invention is not limited thereto.

In another embodiment of the present invention, while the left ear and right ear characteristic loci are established, each of the possible loci corresponding to the left ear and right ear indicated by the three dimensional coordinates of the tri-axial acceleration sensor may be mapped to space xyz by using two or more different mapping relationships simultaneously, so that each locus is corresponding to two or more left ear or right ear characteristic loci indicated by the coordinates of space xyz. For example, each of the motion loci corresponding to the left ear may be formed into two left ear characteristic loci indicated by the coordinates of space xyz according to the left ear mapping relationship and right ear mapping relationship, respectively; similarly, each of the motion loci corresponding to the right ear may be formed into two right ear characteristic loci indicated by the coordinates of space xyz according to the left ear mapping relationship and right ear mapping relationship, respectively. These left ear and right ear characteristic loci can be stored in the storage unit of the Bluetooth headset.

Thus, whether the headset is placed on the left ear or right ear can be identified by comparing the calculated motion locus of the headset with the pre-stored left ear or right ear characteristic loci. Concretely, if the calculated motion locus is best in conformity with certain one of the pre-stored left ear characteristic loci (i.e., being best matched), the headset will be identified as being placed on the left ear; while if the calculated motion locus is best in conformity with certain one of the pre-stored right ear characteristic loci (i.e., being best matched), the headset will be identified as being placed on the right ear.

To be noted, if the pre-stored left ear and right ear characteristic loci are indicated by the three dimensional coordinates of the tri-axial acceleration sensor, the actual locus of the headset may be compared directly with the pre-stored loci. If the pre-stored left ear and right ear characteristic loci are indicated by the three dimensional coordinates of space xyz, a loci comparison can be carried out after the coordinate of the actually detected locus is mapped to the coordinate system of space xyz according to a predetermined mapping relationship (e.g., the left ear mapping relationship or the right ear mapping relationship), when the actual locus of the headset is compared with the pre-stored loci. More particularly, if the pre-stored left ear and right ear characteristic loci are mapped to the coordinate system of space xyz according to the left ear mapping relationship, a loci comparison will be carried out after the actually detected locus is mapped to the coordinate system of space xyz according to the left ear mapping relationship when the actual locus of the headset is compared with the pre-stored characteristic loci; if the pre-stored left ear and right ear characteristic loci are mapped to the coordinate system of space xyz according to the right ear mapping relationship, a loci comparison will be carried out after the actually detected locus is mapped to the coordinate system of space xyz according to the right ear mapping relationship when the actual locus of the headset is compared with the pre-stored characteristic loci.

The examples of left/right ear identification are given as above. According to the embodiment, when a user uses headsets, each headset can automatically judge which ear is it located, so as to correctly receive and play the audio signal of corresponding channel, and hence realize stereo.

In practical operation, when the user holds the headset with left hand or right hand and raises the arm to move the headset to the outside of the ear, the headset may also move along the positive or negative direction of axis x while moving along the axes y and z, at that time, the movement along the positive or negative direction of axis x has no influence on the identification of left ear/right ear, i.e., the implementation of the present invention will not be influenced. So long as the locus of the headset in space xyz firstly moves along the positive directions of axes y and z and then moves along the positive direction of axis x, the ear where the headset finally locates can be identified as the left ear, and so long as the locus of the headset in space xyz firstly moves along the positive directions of axes y and z and then moves along the negative direction of axis x, the ear where the headset finally locates can be identified as the right ear. When left ear or right ear characteristic locus are being simulated, multiple left ear or right ear characteristic loci can be established based on such left ear or right ear locus characteristics.

Figure 6:
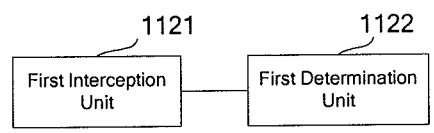
FIG. 6 is a schematic block diagram of a first identification unit according to an embodiment of the present invention.

To be noted, during practical operation, when the headset is picked up by the left hand or right hand, the initial position of the headset is usually not determined. For example, the user may take out the headset from a briefcase and place it on the ear, or pick up the headset from a table and place it on the ear, but in any event, the locus of the headset when the headset is placed by the user to the left ear is different from that when the headset is placed by the user to the right ear, because according to the motion curve of the arm, when the headset is placed on the left ear, there always is a segment of locus that firstly moves along the positive directions of axes y and z (there may also be a movement along the positive or negative direction of axis x while moving along the positive directions of axes y and z), then moves along the positive direction of axis x, and finally stops moving. When the headset is placed on the right ear, there always is a segment of locus that firstly moves along the positive directions of axes y and z (there may also be a movement along the positive or negative direction of axis x while moving along the positive directions of axes y and z), then moves along the negative direction of axis x, and finally stops moving. As an embodiment of the present invention, when the motion locus of the first headset is compared with the predetermined left ear or right ear characteristic loci to identify whether the first headset is placed on the user's left ear or right ear, preferably, only a part of the motion locus of the first headset may be compared with the predetermined left ear or right ear characteristic loci, without considering the initial part of the motion locus of the first headset. At that time, as illustrated in FIG. 6, the first identification unit 112 may further include: a first interception unit 1121 and a first determination unit 1122.

The first interception unit 1121 is configured to intercept a part of motion locus from the tail of the motion locus of the first headset—as used herein, the term "tail" refers to the end or end portion of the motion locus. The intercepted part of motion locus for example may be a motion locus of certain proportion (e.g., but not limited to, 90%, 80%, etc.) intercepted from the tail of the locus according to the time duration or length of the locus, so as to reduce the influence on the identification accuracy by the locus at the initial time. For example, a motion locus during a predetermined period before the moment of stopping moving (i.e., the moment of stopping the process of placing the first headset) may be intercepted from the motion locus. For example, if about 1 second is spent in placing the first headset as illustrated in FIG. 4 on the left ear with the left hand, then the first interception unit 1121 can intercept a motion locus of the headset within 1 second before the operation of placing the first headset on the left ear is completed, as the comparing object.

The first determination unit 1122 is configured to identify whether the first headset is placed on the user's left ear or right ear by comparing the intercepted motion locus with the predetermined left ear or right ear characteristic loci, and transmit the result of identification to the first Bluetooth module. When a comparison is to be performed, if the coordinate system of the intercepted motion locus is inconsistent with that of the predetermined left ear or right ear characteristic loci, a coordinate mapping will be carried out prior to the comparison.

When the first identification unit 112 of the first headset identifies that the first headset is on the left ear, the result of identification will be transmitted to the first Bluetooth module 113, which receives corresponding audio signal of the left channel from a Bluetooth module at the audio signal playing terminal and outputs the audio signal of the left channel. Similarly, when the first identification unit 112 of the first headset identifies that the first headset is on the right ear, the result of identification will be transmitted to the first Bluetooth module 113, which receives corresponding audio signal of the right channel from the Bluetooth module at the audio signal playing terminal and outputs the audio signal of the right channel.

With respect to the second headset, whether the structure of the second headset is same as that of the first headset, the left/right ear can be identified using the completely same way as that used for the first headset, so long as the tri-axial directions of the tri-axial acceleration sensor of the second headset are defined like the first headset.

Therefore, in this example, the second identification unit in the second headset preferably may include: a second interception unit and a second determination unit.

The second interception unit is configured to intercept a part of motion locus from the tail of the motion locus of the second headset. The intercepted part of motion locus for example may be a motion locus of certain proportion (e.g., but not limited to, 90%, 80%, etc.) intercepted from the tail of the locus according to the time duration or length of the locus, so as to reduce the influence on identification accuracy by the locus at the initial time. For example, a motion locus during a predetermined period before the moment of stopping moving (i.e., the moment of stopping the process of placing the second headset) may be intercepted from the motion locus of the second headset. For example, if about 1 second is spent in placing the second headset as illustrated in FIG. 4 on the left ear with the left hand, then the second interception unit can intercept a motion locus of the headset within 1 second before the operation of placing the second headset on the left ear is completed, as the comparing object.

The second determination unit is configured to identify whether the second headset is placed on the user's left ear or right ear by comparing the intercepted motion locus with the predetermined left ear or right ear characteristic loci, and transmit the result of identification to the second Bluetooth module.

When the second identification unit 122 of the second headset identifies that the second headset is on the left ear, the result of identification will be transmitted to the second Bluetooth module 123, which receives corresponding audio signal of the left channel from a Bluetooth module at the audio signal playing terminal and then outputs the audio signal of the left channel. Similarly, when the second identification unit 122 of the second headset identifies that the second headset is on the right ear, the result of identification will be transmitted to the second Bluetooth module 123, which receives corresponding audio signal of the right channel from the Bluetooth module at the audio signal playing terminal and then outputs the audio signal of the right channel.

According to the above example, when the user uses the headset, the headset can automatically judge in which ear is it located, so as to correctly receive and play the audio signal of the corresponding channel, and hence realize stereo.

In addition, if the first identification fails to identify the left/right ear, it can take its latest identification result as the current identification result and output the current identification result to the first Bluetooth module so as to ensure that the Bluetooth module can receive audio signal. Similarly, if the second identification fails to identify the left/right ear, it can take its latest identification result as the current identification result and output the current identification result to the second Bluetooth module. Herein the latest identification result is just an example and the present invention is not limited thereto.

As mentioned above, the stereo Bluetooth headset in the embodiment of the present invention can automatically identify the left/right ear without the user's distinguishing, so as to correctly receive and output the audio signal of corresponding channel, which not only provides convenience to common users, but also solves the problem that the blind men have difficulty to use a conventional Bluetooth headset to listen to the stereo music.

In another embodiment of the present invention, the first headset and the second headset may also be provided with wireless rechargeable batteries, so as to supply energy with the existing wireless charging technique and further improve the convenience of using the Bluetooth headset.

Figure 7:
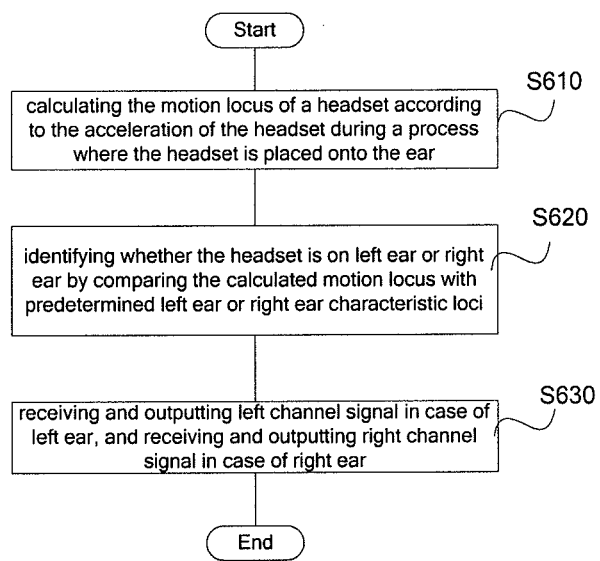
FIG. 7 is a flowchart of stereo reception and output implemented by a first headset or a second headset in a Bluetooth headset of the present invention.

As can be seen from the above example, an embodiment of the present invention further provides a method of receiving and outputting stereo by using the Bluetooth headset. As illustrated in FIG. 7, the method includes performing the following steps for both the first and second headsets:

Step S610: step of locus detection: calculating the motion locus of a headset according to the acceleration of the headset during a process of placing the headset (first headset or second headset) on the user's ear.

Step S620: step of identification: identifying whether the headset is placed on the left ear or right ear by comparing the motion locus of the headset with predetermined left ear or right ear characteristic loci.

For example, as described above, so long as the locus of the headset in space xyz firstly moves along the positive directions of axes y and z and then moves along the positive direction of axis x, the ear where the headset finally locates can be identified as the left ear, and so long as the locus of the headset in space xyz firstly moves along the positive directions of axes y and z and then moves along the negative direction of axis x, the ear where the headset finally locates can be identified as the right ear.

Step S630: step of output: when the headset is identified as being placed on the user's left ear, a Bluetooth module provided on the headset receives and outputs the audio signal of the left channel, and when the headset is identified as being placed on the user's right ear, the audio signal of the right channel is received and outputted.

Figure 8:
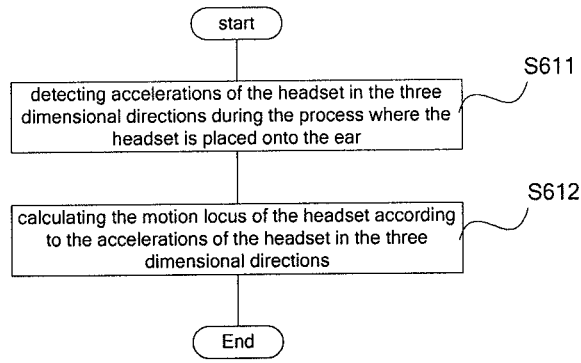
FIG. 8 is a flowchart of headset locus detection according to an embodiment of the present invention.

In the preferred embodiment of the present invention, as illustrated in FIG. 8, Step S610 may further include:

Step S611: detecting accelerations of the headset in the three dimensional directions during the process of placing the headset on the user's ear; and Step S612: calculating the motion locus of the headset according to the accelerations of the headset in the three dimensional directions.

Figure 9:
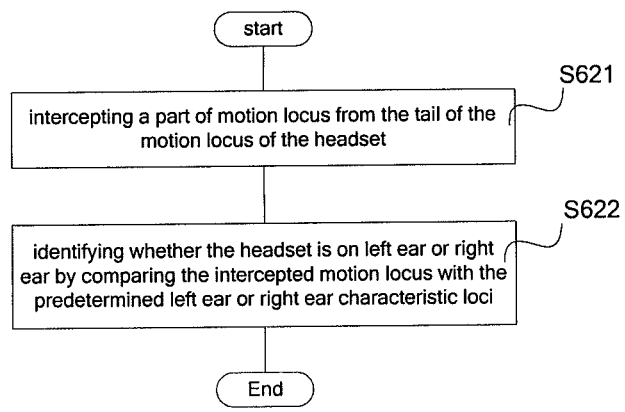
FIG. 9 is a flowchart of left and right ear identification according to an embodiment of the present invention.

In the preferred embodiment of the present invention, as illustrated in FIG. 9, Step S620 may further include:

Step S621: intercepting a part of motion locus from the tail of the motion locus of the headset. For example, a motion locus during a predetermined period before the moment of stopping the process of placing the headset may be intercepted from the motion locus of the headset.

Step S622: identifying whether the headset is placed on the user's left ear or right ear by comparing the intercepted motion locus with the predetermined left ear or right ear characteristic loci.

According to the above embodiment of the present invention, the audio signal of corresponding channel can be correctly received and played by automatically judging which ear is the headset located, so as to realize stereo output.

EXAMPLE 2

The above Example 1 illustrates the identifications of left ear and right ear by the Bluetooth headset when the Bluetooth headset is placed on right ear with right hand and placed on the ear with left hand. The motion of the Bluetooth headset is substantially translational motion when the Bluetooth headset is placed on right ear with right hand and placed on the left ear with left hand, thus the locus detection unit in the Bluetooth headset can simply and accurately calculate the motion locus of the headset just using the linear accelerations in the tri-axial directions detected by the tri-axial acceleration sensor. Even if the initial motion of the headset is not translational motion, then the identifications of left ear and right ear can also be realized by omitting the initial motion locus and just comparing the rear part of the whole motion locus of the headset with the characteristic loci.

However, with respect to more complicated motions, for example during a process where the user's left hand places the headset on the right ear or the user's right hand places the headset on the left ear, the headset will rotate obviously, and at that time, it is difficult to accurately calculate the motion locus of the headset in the space xyz just using the tri-axial acceleration sensor.

As an example, during a process where the user's left hand places the first headset as illustrated in FIG. 4 on the right ear, the actions for example may include:

1) The user holds the first headset (the sound outgoing hole is rightward) with the left hand, and raises the forearm so as to move the first headset to the outside of the right ear, then rotates the first headset so that it is in the view state as illustrated in FIG. 5, i.e., the sound outgoing hole is leftward; or the user may rotate the first headset during the process of holding the first headset with the left hand and moving the first headset to the outside of the right ear, so that the sound outgoing hole is leftward.

The substantial locus corresponding to this action in the previously defined space xyz is as follows: moving along the positive directions of axes x, y, z, and rotating the headset simultaneously or subsequently so that the sound outgoing hole of the headset is leftward.

2) The user places the first headset on the right ear (e.g., places the first headset in the right auricle), and then stops the action.

The substantial locus corresponding to this action in space xyz is as follows: moving along the negative direction of axis x and then stopping.

During a process where the user's right hand places the first headset as illustrated in FIG. 5 on the left ear, the actions for example may include:

1) The user holds the first headset (the sound outgoing hole is leftward) with the right hand, and raises the forearm so as to move the first headset to the outside of the left ear, then rotates the first headset so that it is in the view state as illustrated in FIG. 4, i.e., the sound outgoing hole is rightward; or the user may rotate the first headset during the process of holding the first headset with the right hand and moving the first headset to the outside of the left ear, so that the sound outgoing hole is rightward.

The substantial locus corresponding to this action in space xyz is as follows: moving along the negative direction of axis x and the positive directions of axes y, z, and rotating the headset simultaneously or subsequently so that the sound outgoing hole of the headset is rightward.

2) The user places the first headset on the left ear (e.g., places the first headset in the left auricle), and then stops the action.

The substantial locus corresponding to this action in space xyz is as follows: moving along the positive direction of axis x and then stopping.

Under the above condition, the motion of the headset not only includes translation, but also includes rotation, thus the actual motion locus of the headset is a composite motion composed of translation and rotation, at that time, it is infeasible to calculate the motion locus just based on the liner acceleration detected by the tri-axial acceleration sensor, and the rotational angular velocities of the Bluetooth headset around tri-axial directions of the tri-axial acceleration sensor also will be detected. The translational velocity of the headset can be acquired by performing a integration of accelerations of the headset in the tri-axial directions of the tri-axial acceleration sensor, the translational displacements of the headset along the three axes can be calculated by performing a double integration of the accelerations, and the rotational angles of the headset around the three axes can be calculated by using the rotational angular velocities of the headset, thus the relative position of the headset in the space can be easily determined, and the motion locus of the headset can be obtained. Since calculating the motion locus of an object according to the acceleration and angular velocity of the object is the prior art, herein it is not described in details. "Pen motion attitude measurement using accelerometer and gyroscope" by Cao Li, etc. (Chinese Journal of Scientific Instrument, Issue 4, 2004)

introduces a three dimensional space orientation performed according to angular velocities around axes X, Y, Z and accelerations in directions X, Y, Z.

Figure 10:
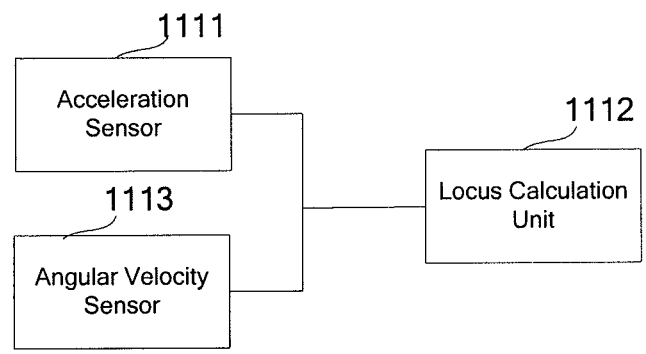
FIG. 10 is a block diagram of Example 2 of a locus detection unit in FIG. 1.

In this Example 2, in order to achieve more accurate detection of the motion locus of the headset, as illustrated in FIG. 10, the locus detection unit (first locus detection unit and second locus detection unit) of each headset (first headset and second headset) in the Bluetooth headset includes not only an acceleration sensor 1111, but also an angular velocity sensor 1113. In this example, components except the locus detection unit are same as those in Example 1, thus the descriptions of those components are omitted herein.

The acceleration sensor 1111 is preferably a tri-axial acceleration sensor configured to detect accelerations (linear accelerations) in the three dimensional directions (e.g., three coordinate axes) of the headset during a process where the headset is placed on the user's ear.

The angular velocity sensor 1113 is configured to detect angular velocities of the headset around at least one of the three axes during a process where the headset is placed on the user's ear. For example, the angular velocity sensor may be configured to detect angular velocities of the headset around the three axes (axes X, Y, Z), or only angular velocity of the headset around axis Z or axes Z, X. the motion locus of the headset can be detected most accurately when the angular velocities around the three axes are detected. In the embodiment of the present invention, the angular velocity sensor may be a gyroscope.

The locus calculation unit 1112 is configured to calculate the motion locus of the headset according to the acceleration detected by the acceleration sensor and the angular velocity detected by the angular velocity sensor. During the detection, the locus calculation unit may calculate the motion locus of the headset in relation to the initial position according to the acceleration and angular velocity by taking a coordinate system established by the three axes X, Y, Z of the tri-axial acceleration sensor when the headset is at the initial position (detection start position) as the reference coordinate system.

In the examples of the present invention, the acceleration sensor 1111 and the angular velocity sensor 1113 may be integrated, e.g., embodied as hex-axial sensor.

With such locus detection structure, during the process where the headset is placed onto the ear, the motion locus of the headset relative to the initial detection position in the tri-axial coordinate system can be detected whether the headset rotates or not.

In this example, the first headset and the second headset may have the completely same structure.

In Example 2, the directions of the three axes in the tri-axial acceleration sensor and the directions of the three axes in space xyz may be defined like those in Example 1. Subsequently, multiple left ear characteristic loci and multiple right ear characteristic loci may be pre-established according to the possible loci when the user places the headset on the left ear and right ear, and then be stored in a storage unit of the Bluetooth headset. The left ear characteristic locus and the right ear characteristic locus may be indicated by taking the coordinate system (hereinafter referred to as initial position coordinate system) established by the three axes X, Y, Z of the tri-axial acceleration sensor at the initial position (detection start position) as the reference coordinate system, or taking the three dimensional coordinate system of space xyz as the reference coordinate system. When the coordinate system of space xyz is used to indicate the left ear and right ear characteristic loci, the left ear and right ear characteristic loci indicated by the initial position coordinate system may be mapped to the coordinate system of space xyz according to predetermined mapping relationship, respectively, to form the left ear and right ear characteristic loci in space xyz. The predetermined mapping relationship may be determined as follows: the angular relationship between axes X, Y, Z of the initial position coordinate system and axes X, Y, Z of the detection completion position (left ear or right ear) may be calculated using the angular velocity sensor, while the correspondence relationship between axes X, Y, Z of the detection completion position (left ear or right ear) and axes x, y, z of the coordinate system of space xyz may be arranged as the predetermined mapping relationship (e.g., the aforementioned left ear mapping relationship and/or right ear mapping relationship), thus the mapping relationship between the initial position coordinate system and the coordinate system of space xyz may be determined using the above angular relationship and predetermined mapping relationship.

Thus, whether the headset is placed on the left ear or right ear can be identified by comparing the calculated motion locus of the headset with the pre-stored left ear or right ear characteristic loci. As an example, if the calculated motion locus is best in conformity with certain one of the pre-stored left ear characteristic loci (i.e., being best matched), the headset will be identified as being placed on the left ear; while if the calculated motion locus is best in conformity with certain one of the pre-stored right ear characteristic loci (i.e., being best matched), the headset will be identified as being placed on the right ear.

To be noted, if the pre-stored left ear and right ear characteristic loci are indicated by the initial position coordinate system that is the reference coordinate system, the actual locus of the headset may be compared directly with the pre-stored loci. If the pre-stored left ear and right ear characteristic loci are indicated by the three dimensional coordinates of space xyz, a loci comparison can be carried out after the coordinate of the actually detected locus is mapped to the coordinate system of space xyz according to a mapping relationship between the reference coordinate system of the actual locus and the coordinate system of space xyz, when the actual locus of the headset is compared with the pre-stored loci. The mapping relationship may be determined as follows: the angular relationship between axes X, Y, Z at the locus start position and axes X, Y, Z at the locus end position (left ear or right ear) may be calculated using the angular velocity sensor, while the correspondence relationship between axes X, Y, Z at the locus end position (left ear or right ear) and axes x, y, z is the predetermined mapping relationship (e.g., the aforementioned left ear mapping relationship and/or right ear mapping relationship), thus the mapping relationship between the reference coordinate system of the actual locus and the coordinate system of space xyz may be determined using the above angular relationship and predetermined mapping relationship.

The examples of left/right ear identification are given as above. According to an embodiment, when a user uses the headset, the headset can automatically judge which ear is it located, so as to correctly receive and play the audio signal of corresponding channel, and hence realize stereo. As compared with Embodiment 1, the accuracy of identification can be further improved.

The method of receiving and outputting stereo in this example differs from the method of Example 1 in the step of locus detection (S610). In this example, the step of locus detection, for example, includes: calculating the motion locus of the headset according to the acceleration and angular velocity of the headset during the process of placing the headset (first headset or second headset) onto the user's ear. The acceleration may be accelerations of the headset in the directions of predetermined three axes (e.g., the aforementioned axes X, Y, Z). The angular velocity may be angular velocity when the headset rotates around at least one of the three axes (e.g., the aforementioned axis Z).

Figure 11:
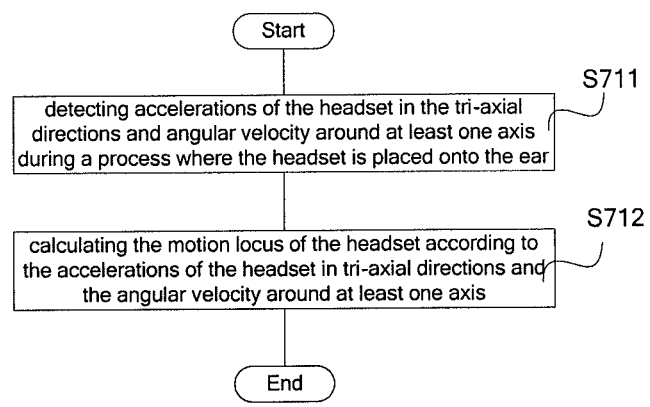
FIG. 11 is a flowchart of headset locus detection according to another embodiment of the present invention.

Preferably, as illustrate in FIG. 11, the step of locus detection further includes:

Step S711: detecting accelerations of the headset in the tri-axial (i.e., three dimensional) directions and angular velocity around at least one axis, during a process where the headset is placed onto the user's ear; and Step S712: calculating the motion locus of the headset according to the accelerations of the headset in the tri-axial directions and the angular velocity around at least one axis.

Other steps in this example are same as corresponding steps in Example 1.

According to the above example of the present invention, the audio signal of corresponding channel can be correctly received and played by automatically judging the ear on which the headset is placed, so as to realize stereo output.

Embodiment 2

Figure 12:
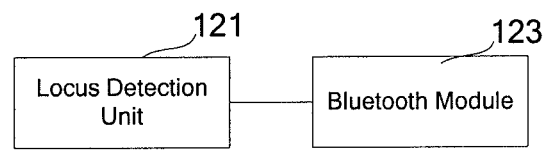
FIG. 12 is a schematic block diagram of a Bluetooth headset according to another embodiment of the present invention.
Figure 13:
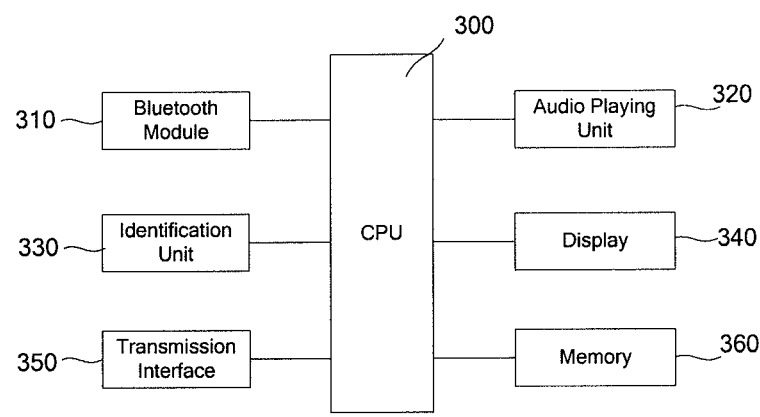
FIG. 13 is a schematic block diagram of an audio playing terminal according to another embodiment of the present invention.

In Embodiment 2, the identification of left/right ear according to the motion locus of the headset is arranged to be carried out in an audio playing terminal. FIG. 12 is a block diagram of a Bluetooth headset (first headset) according to the present embodiment. FIG. 13 is a block diagram of an audio playing terminal according to the present embodiment.

As illustrated in FIG. 12, the first headset may include a locus detection unit 121 and a Bluetooth module 123. The locus detection unit is configured to detect the motion locus of the first headset during a process where the headset is placed onto the user's ear. The locus detection unit 121 may have a structure same as that of the locus detection unit as illustrated in FIG. 2 or 10, thus detailed descriptions of the locus detection unit 121 are omitted herein. The Bluetooth module 123 is configured to transmit the motion locus detected by the locus detection unit 121 to the audio playing terminal, and receive a left channel reception instruction or right channel reception instruction from the audio playing terminal. Thus the Bluetooth module 123 may receive corresponding left channel audio signal or right channel audio signal from the audio playing terminal, according to the left channel reception instruction or right channel reception instruction.

Preferably, the first headset may be further provided with a control switch configured to control the startup of at least one of the locus detection unit 121 and the Bluetooth module 123.

As illustrated in FIG. 13, the audio playing terminal for example may include: a CPU 300, a Bluetooth module (also called as terminal Bluetooth module) 310, an audio playing unit 320, an identification unit 330, a display 340, a data transmission interface 350 and a memory 360. The audio playing unit 320 for example is configured to play audio files. The memory 360 is configured to store data such as audio files. In the present embodiment, the memory 360 is further configured to store pre-established left ear and right ear characteristic loci. The display 340 (e.g., LCD) is configured to display objects such as image and text. The transmission interface 350 is configured for data transmission with an external device.

In the present embodiment, the Bluetooth module 310 is capable of wireless data transmission and reception. For example, the Bluetooth module 310 may receive a motion locus of the first headset from the first headset, and outputs the motion locus to the identification unit 330.

The identification unit 330 is configured to identify whether the first headset is placed on the user's left ear or right ear by comparing the motion locus of the first headset with the predetermined left ear or right ear characteristic loci, and notify the first headset, through the Bluetooth module 310, of information indicating the result of identification by the identification unit 330, i.e., left channel reception instruction or right channel reception instruction corresponding to the result of identification. More particularly, when the result of identification is left ear, the identification unit 330 generates a left channel reception instruction and transmits it to the first headset through the Bluetooth module 310; when the result of identification is right ear, the identification unit 330 generates a right channel reception instruction and transmits it to the first headset through the Bluetooth module 310. The left or right channel reception instruction may be the result of identification per se.

Preferably, the identification unit 330 may include the interception unit 1121 and the determination unit 1122 as illustrated in FIG. 6, and the details are same as those in Example 1, herein are not described again.

When there are two Bluetooth headsets, the other Bluetooth headset (second headset) may have the completely same configuration as the first headset and perform the same operation. Or, the locus detection unit is not provided on the second headset, while the audio playing terminal directly transmits an identification result opposite to the identification result of the first headset to the second headset according to the identification result of the first headset. At that time, the identification unit 330 is further configured to control the Bluetooth module 310 to transmit the right channel reception instruction to the second Bluetooth headset, when the identification result of the first headset is left ear, and control the Bluetooth module 310 to transmit the left channel reception instruction to the second Bluetooth headset, when the identification result of the first headset is right ear.

Figure 14:
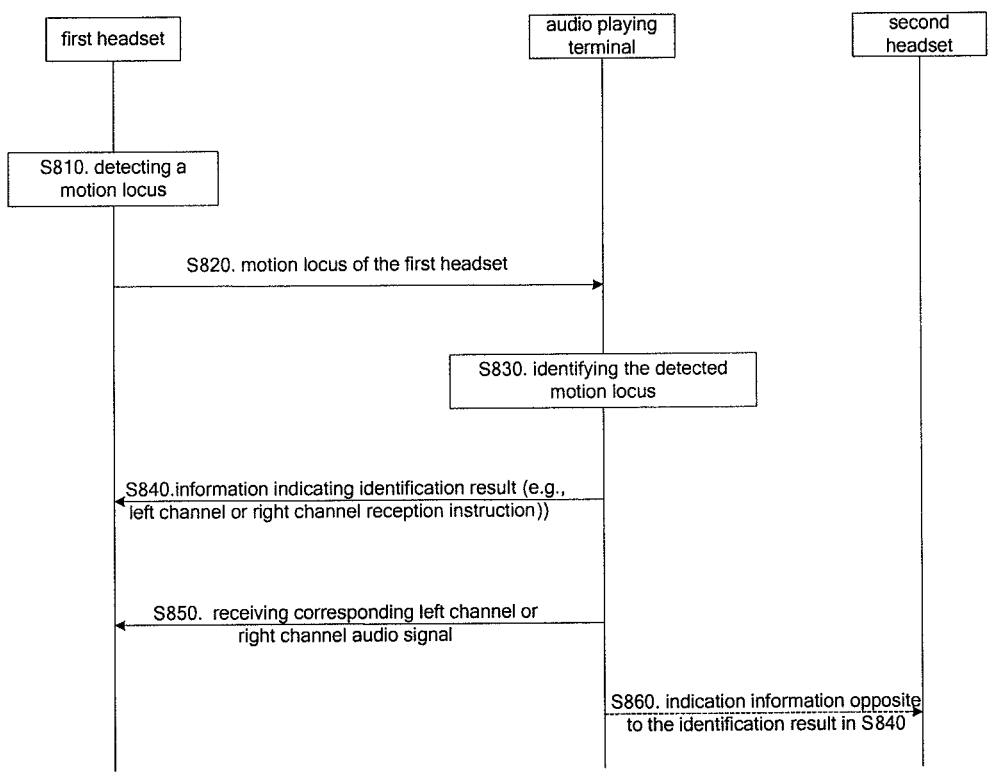
FIG. 14 is a flowchart of audio playing.

The above audio playing terminal and the first headset may constitute an audio playing system as illustrated in FIG. 14. The audio playing system plays audio files in the following steps:

Step S810: for example when the first headset is to be used for listening to the music, the locus detection unit 121 of the first headset detects the motion locus of the first headset during the process where the first headset is placed onto the user's ear. The way for detecting the motion locus is same as that in Embodiment 1. For example, the motion locus of the first headset may be calculated according to the accelerations of the first headset in the tri-axial directions, or be calculated according to the accelerations of the first headset in the tri-axial directions and the angular velocity around at least one axis. The detailed descriptions are omitted herein.

Step S820: the first headset transmits the motion locus of the first headset to the audio playing terminal through the Bluetooth module 113.

Correspondingly, the audio playing terminal receives the motion locus from the first headset through the Bluetooth module 310.

Step S830: the identification unit 330 of the audio playing terminal identifies whether the first headset is placed on the user's left ear or right ear based on the motion locus of the first headset.

More particularly, the identification unit 330 identifies whether the first headset is placed on the user's left ear or right ear by comparing the motion locus of the first headset with the predetermined left ear or right ear characteristic loci.

More preferably, Step S830 may further include the following steps: intercepting a part of motion locus from the tail of the motion locus of the first headset; and identifying whether the first headset is placed on the user's left ear or right ear by comparing the intercepted motion locus with the predetermined left ear or right ear characteristic loci.

The intercepted part of motion locus for example may be a motion locus of certain proportion (e.g., but not limited to, 90%, 80%, etc.) intercepted from the tail of the locus according to the time duration or length of the locus, so as to reduce the influence on identification accuracy by the locus at the initial time.

Step S840: the identification unit 330 notifies information indicating the result of identification to the first headset through the Bluetooth module 310.

For example, the identification unit 330 transmits the left or right channel reception instruction corresponding to the identification result to the first headset through the Bluetooth module 310. The left or right channel reception instruction corresponding to the identification result may be the identification result per se, e.g., but not limited to, "left" or "right", or information like "0" or "1" identified with "left" and "right" respectively.

Step S850: the first headset receives and outputs left channel audio signal or right channel audio signal corresponding to the identification result according to the information indicating the identification result from the audio playing terminal.

For example, the first headset receives the left or right channel reception instruction from the audio playing terminal through the Bluetooth module 113, and receives corresponding left or right channel audio signal from the audio playing terminal according to the left or right channel reception instruction.

Through the above steps, when the first headset is randomly placed on the left ear or right ear, the Bluetooth headset will automatically receive corresponding left or right channel audio signal according to the identification result of the audio playing terminal.

If the user wants to listen to the stereo, two headsets are provided. At that time, the audio playing system further includes the other Bluetooth headset (second headset). In an embodiment, the second headset has the completely same configuration as the first headset, and when the second headset is placed onto the user's ear, the second headset and the audio playing terminal also adopt the above steps S810~S850 so that the second headset receives the left or right channel audio signal according to the identification result. Thus, when the two Bluetooth headsets are placed on the left and right ears respectively, the left and right channel audio signals corresponding to the left and right ears can be received in the two headsets, respectively.

In addition, another available way for listening to the stereo is not to provide the locus detection unit in the second headset. Since the audio playing terminal has identified the motion locus of the first headset and determined whether the first headset is on the left ear or right ear, at that time, the audio playing terminal can deduce that the second headset is on an ear other than the ear where the first headset is located, for example, if the first headset is identified as being on the left ear, then the second headset can be deduced as being on the right ear. Thus, the audio playing terminal may directly transmit the left or right channel reception instruction to the second headset. Therefore, when two Bluetooth headsets are used to listen to the stereo, the above flow further includes:

Step S860: the identification unit 330 of the audio playing terminal transmits the right channel reception instruction to the second headset through the Bluetooth module 310 when identifying that the first headset is on the left ear, and transmits the left channel reception instruction to the second headset through the Bluetooth module 310 when identifying that the first headset is on the right ear.

In the present embodiment, the Bluetooth headset can acquire whether it is on the left ear or right ear through an interaction with the audio playing terminal, so as to accurately receive the audio signal of corresponding channel, thus the stereo can be easily received.

It shall be appreciated that various portions of the embodiments of the present invention can be implemented in hardware, software, firmware, or a combination thereof. In the above described embodiments, multiple steps or methods may be implemented in software or firmware that is stored in a memory and executed by a suitable instruction execution system.

The above descriptions and drawings illustrate the various features of the present invention. It shall be appreciated that the appropriate computer code could be prepared by a person who has ordinary skill in the art to carry out the various steps and processes described above and illustrated in the drawings.

Specific embodiments of the present invention are disclosed herein. A person skilled in the art will easily realize that the present invention may have other applications in other environments. In fact, many other embodiments and implementations are also possible. The accompanied claims are in no way intended to limit the scope of the present invention to the Specific embodiments described above.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, apparatus, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An audio playing terminal, comprising:
a Bluetooth module configured to receive from a first Bluetooth headset a motion locus of the first Bluetooth headset, wherein:
the motion locus is calculated from detected accelerations of the first Bluetooth headset in three dimensional directions during the process where the first Bluetooth headset is placed onto a user's ear;
the motion locus represents movement of the first Bluetooth headset as it is placed onto the user's ear; and
the motion locus calculated as the first Bluetooth headset is placed by a user onto one of the user's ears differs from the motion locus calculated as the first Bluetooth headset is placed by the user onto the user's other ear; and
an identification unit configured to identify whether the first Bluetooth headset is placed on the user's left ear or right ear by comparing the motion locus of the first Bluetooth headset with predetermined left ear or right ear characteristic loci, and transmit left channel or right channel reception instruction corresponding to the identification result to the first Bluetooth headset through the Bluetooth module.

2. The audio playing terminal according to claim 1, further comprising a storage unit configured to store the left ear or right ear characteristic loci.

3. The audio playing terminal according to claim 1, wherein,
the identification unit is further configured to transmit the right channel reception instruction to a second Bluetooth headset through the Bluetooth module when the identification result is left ear, and transmit the left channel reception instruction to the second Bluetooth headset through the Bluetooth module when the identification result is right ear.

4. The audio playing terminal according to claim 1, wherein, the identification unit comprising:
an interception unit configured to intercept a part of motion locus from the tail of the motion locus of the first Bluetooth headset; and
a determination unit configured to identify whether the first Bluetooth headset is placed on the user's left ear or right ear by comparing the intercepted motion locus with the predetermined left ear or right ear characteristic loci, and transmit an identification result to the Bluetooth module.

5. An audio playing system comprising an audio playing terminal and a first Bluetooth headset, wherein:
the first Bluetooth headset comprising:
a first locus detection unit configured to detect a motion locus of the first Bluetooth headset during a process where the first Bluetooth headset is placed onto the user's ear;
the motion locus represents movement of the first Bluetooth headset as it is placed onto the user's ear; and
the motion locus calculated as the first Bluetooth headset is placed by a user onto one of the user's ears differs from the motion locus calculated as the first Bluetooth headset is placed by the user onto the user's other ear; and
the first locus detection unit comprising:
an acceleration sensor configured to detect accelerations of the Bluetooth headset in three dimensional directions; and
a locus calculation unit configured to calculate the motion locus of the Bluetooth headset according to the detected accelerations; and
a first Bluetooth module configured to transmit the motion locus to the audio playing terminal, receive left channel or right channel reception instruction from the audio playing terminal, and receive corresponding left channel or right channel audio signal from the audio playing terminal according to the left channel or right channel reception instruction; and
the audio playing terminal comprising:
a terminal Bluetooth module configured to receive from the first Bluetooth headset the motion locus of the first Bluetooth headset; and
an identification unit configured to identify whether the first Bluetooth headset is placed on the user's left ear or right ear by comparing the motion locus of the first Bluetooth headset with predetermined left ear or right ear characteristic loci, and transmit left channel or right channel reception instruction corresponding to the identification result to the first Bluetooth headset through the Bluetooth module.

6. The system according to claim 5, wherein, the audio playing terminal further comprising a storage unit configured to store the left ear or right ear characteristic loci.

7. The system according to claim 5, further comprising a second Bluetooth headset;
the identification unit is further configured to transmit the right channel reception instruction to the second Bluetooth headset through the terminal Bluetooth module when the identification result is left ear, and transmit the left channel reception instruction to the second Bluetooth headset through the terminal Bluetooth module when the identification result is right ear.

8. The system according to claim 5, further comprising a second Bluetooth headset including a second locus detection unit and a second Bluetooth module;
the second locus detection unit is configured to detect a motion locus of the second Bluetooth headset during a process where the second Bluetooth headset is placed onto the user's ear;
the second Bluetooth module is configured to transmit the motion locus of the second Bluetooth headset to the audio playing terminal, receive left channel or right channel reception instruction from the audio playing terminal, and receive corresponding left channel or right channel audio signal from the audio playing terminal according to received left channel or right channel reception instruction;
the terminal Bluetooth module is further configured to receive from the second Bluetooth headset the motion locus of the second Bluetooth headset;
the identification unit is further configured to identify whether the second Bluetooth headset is placed on the user's left ear or right ear by comparing the motion locus of the second Bluetooth headset with the predetermined left ear or right ear characteristic loci, and transmit the left channel or right channel reception instruction corresponding to the identification result to the second Bluetooth headset through the Bluetooth module.

9. A Bluetooth headset, comprising:
a locus detection unit configured to detect a motion locus of the Bluetooth headset during a process where the Bluetooth headset is placed onto the user's ear;
the motion locus represents movement of the first Bluetooth headset as it is placed onto the user's ear;
the motion locus calculated as the first Bluetooth headset is placed by a user onto one of the user's ears differs from the motion locus calculated as the first Bluetooth headset is placed by the user onto the user's other ear;
the locus detection unit comprising:
an acceleration sensor configured to detect accelerations of the Bluetooth headset in three dimensional directions; and
a locus calculation unit configured to calculate the motion locus of the Bluetooth headset according to the detected accelerations; and
an identification unit and a Bluetooth module, wherein:
the identification unit is configured to identify whether the Bluetooth headset is placed on the user's left ear or right ear by comparing the motion locus of the Bluetooth headset with predetermined left ear or right ear characteristic loci, and transmit an identification result to the Bluetooth module;
the Bluetooth module is configured to receive left channel audio signal when the identification result of the identification unit is left ear, and receive right channel audio signal when the identification result is right ear.

10. The Bluetooth headset according to claim 9, characterized in that, the locus detection unit comprising:
- an acceleration sensor configured to detect accelerations of the Bluetooth headset in three dimensional directions;
- an angular velocity sensor configured to detect angular velocity of the Bluetooth headset around at least one of the three dimensional directions; and
- a locus calculation unit configured to calculate the motion locus of the Bluetooth headset according to the accelerations detected by the acceleration sensor and the angular velocity detected by the angular velocity sensor.

11. The Bluetooth headset according to claim 9, wherein, the identification unit comprising:
- an interception unit configured to intercept a part of motion locus from the tail of the motion locus of the first Bluetooth headset; and
- a determination unit configured to identify whether the first Bluetooth headset is placed on the user's left ear or right ear by comparing the intercepted motion locus with the predetermined left ear or right ear characteristic loci, and transmit an identification result to the Bluetooth module.

12. The Bluetooth headset according to claim 9, further comprising a storage unit configured to store the left ear or right ear characteristic loci.

13. The Bluetooth headset according to claim 9, further comprising a switch configured to control the startup of at least one of the locus detection unit, the identification unit and the Bluetooth module.

14. An audio playing method using Bluetooth headset, comprising:
- a step of locus detection: detecting a motion locus of the Bluetooth headset during a process where the Bluetooth headset is placed onto the user's ear;
- the motion locus represents movement of the Bluetooth headset as it is placed onto the user's ear; and
- the motion locus calculated as the Bluetooth headset is placed by a user onto one of the user's ears differs from the motion locus calculated as the Bluetooth headset is placed by the user onto the user's other ear; and
- the step of locus detection comprising:
  - detecting accelerations of the Bluetooth headset in three dimensional directions during the process where the Bluetooth headset is placed onto the user's ear; and
  - calculating the motion locus of the Bluetooth headset according to the detected accelerations;
- a step of identification: identifying whether the Bluetooth headset is placed on the left ear or right ear by comparing the motion locus of the Bluetooth headset with predetermined left ear or right ear characteristic loci; and
- a step of output: receiving and outputting, by the Bluetooth headset, left channel or right channel audio signal corresponding to an identification result in the step of identification.

15. The method according to claim 14, wherein, the step of locus detection is performed in the Bluetooth headset, and the step of identification is performed in an audio playing terminal, the method further comprising:
- transmitting, by the Bluetooth headset, the motion locus of the Bluetooth headset to the audio playing terminal; and
- notifying, by the audio playing terminal, information indicating the identification result in the step of identification to the Bluetooth headset.

16. The method according to claim 14, wherein, detecting the motion locus of the Bluetooth headset during the process where the Bluetooth headset is placed onto the user's ear comprising:
- detecting accelerations of the Bluetooth headset in three dimensional directions and angular velocity of the Bluetooth headset around at least one of the three dimensional directions during the process where the Bluetooth headset is placed onto the user's ear; and
- calculating the motion locus of the Bluetooth headset according to the detected accelerations and angular velocity.

17. The method according to claim 14, wherein, identifying whether the Bluetooth headset is placed on the left ear or right ear by comparing the motion locus of the Bluetooth headset with the predetermined left ear or right ear characteristic loci comprising:
- intercepting a part of motion locus from the tail of the motion locus of the Bluetooth headset; and identifying whether the Bluetooth headset is placed on the user's left ear or right ear by comparing the intercepted motion locus with the predetermined left ear or right ear characteristic loci.

* * * * *